United States Patent
Zhu et al.

(10) Patent No.: US 9,726,574 B2
(45) Date of Patent: Aug. 8, 2017

(54) ZEROING METHOD AND ZEROING DEVICE FOR OPTICAL TIME-DOMAIN REFLECTOMETER

(71) Applicant: ZTE CORPORATION, Shenzhen, Guangdong Province (CN)

(72) Inventors: Meidong Zhu, Shenzhen (CN); Han Xu, Shenzhen (CN); Jianzhang Chen, Shenzhen (CN); Jianxin Lu, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/783,165

(22) PCT Filed: Sep. 16, 2013

(86) PCT No.: PCT/CN2013/083568
§ 371 (c)(1),
(2) Date: Oct. 8, 2015

(87) PCT Pub. No.: WO2014/166209
PCT Pub. Date: Oct. 16, 2014

(65) Prior Publication Data
US 2016/0047713 A1    Feb. 18, 2016

(30) Foreign Application Priority Data
Apr. 9, 2013 (CN) .......................... 2013 1 0120555

(51) Int. Cl.
G01N 21/00 (2006.01)
G01M 11/00 (2006.01)
H04B 10/071 (2013.01)

(52) U.S. Cl.
CPC ....... G01M 11/3109 (2013.01); H04B 10/071 (2013.01)

(58) Field of Classification Search
CPC ........... G01M 11/3145; G01M 11/335; G01M 11/33; G01M 11/3109; G01M 11/338
(Continued)

(56) References Cited

U.S. PATENT DOCUMENTS

| | | |
|---|---|---|
| 4,599,571 A | 7/1986 | Matsuno |
| 5,020,872 A | 6/1991 | DuPuy et al. |

(Continued)

FOREIGN PATENT DOCUMENTS

| | | |
|---|---|---|
| CN | 102025326 A | 4/2011 |
| CN | 102969991 A | 3/2013 |

(Continued)

OTHER PUBLICATIONS

International Search Report issued Jan. 9, 2014 in International Application No. PCT/CN2013/083568.
(Continued)

*Primary Examiner* — Tarifur Chowdhury
*Assistant Examiner* — Md M Rahman
(74) *Attorney, Agent, or Firm* — Plumsea Law Group, LLC

(57) ABSTRACT

A zeroing method and zeroing device for an optical time-domain reflectometer (OTDR) are disclosed. The zeroing method includes: before starting the optical time-domain reflectometer, when a laser device is in an off state, sending a zeroing signal; and performing zeroing processing according to the zeroing signal. In the embodiments of the present invention, the feedback zeroing can be performed on a receiving circuit by utilizing the idle time prior to a test or during the test, thus the influence of an offset voltage is reduced, and a problem of operational-amplifier zero drift also can be solved in the meantime, which improves a detectability of the OTDR, and overcomes a disadvantage that a manual zeroing method is not intelligent and a (Continued)

measured waveform introduced in an automatic zeroing method is bad.

15 Claims, 3 Drawing Sheets

(58) Field of Classification Search
USPC .......................................................... 356/73.1
See application file for complete search history.

(56) References Cited

U.S. PATENT DOCUMENTS

| | | |
|---|---|---|
| 5,062,704 A | 11/1991 | Bateman |
| 5,319,266 A | 6/1994 | Chu et al. |
| 2007/0184803 A1* | 8/2007 | Aytur ................. H04B 1/30 455/296 |
| 2014/0299751 A1* | 10/2014 | Tang .................. G01J 1/0425 250/227.11 |

FOREIGN PATENT DOCUMENTS

| | | |
|---|---|---|
| CN | 103248423 A | 8/2013 |
| CN | 105323001 A | 2/2016 |

OTHER PUBLICATIONS

European Search Report issued Mar. 16, 2016 in European Patent Application No. EP13881634.3.
Chinese Office Action dated Oct. 28, 2016 for Chinese Patent Application No. 201310120555.5.

\* cited by examiner

ZEROING METHOD AND ZEROING DEVICE FOR OPTICAL TIME-DOMAIN REFLECTOMETER

CROSS-REFERENCE TO RELATED APPLICATION(S)

This application is the U.S. National Phase application of PCT application number PCT/CN2013/083568 having a PCT filing date of Sep. 16, 2013, which claims priority of Chinese patent application 201310120555.5 filed on Apr. 9, 2013, the disclosures of which are hereby incorporated by reference.

TECHNICAL FIELD

The present document relates to the field of optical communication network, and particularly, to a zeroing method and zeroing device for an optical time-domain reflectometer.

BACKGROUND OF THE RELATED ART

The optical fiber communication technology has become one of main pillars of the modern communication, and it plays a pivotal role in the modern telecommunication network. Optical fiber communication is an emerging technology, and its fast speed of development and wide scope of application in recent years are rare in the history of communications, and it is also an important symbol of the new technological revolution in the world and a major tool for transferring various information in the future information society.

With the continuous promotion of the "tri-networks integration" service demands, basically the optical fiber is used as a trunk line in all backbone networks between provinces and countries, in backbone networks within common cities. A backbone network is an important architecture element for constructing an enterprise network. The backbone network provides paths for information interchange between different local area networks or subnetworks. In common cases, the capacity of the backbone network is greater than the capacity of the network connected to the backbone network. The backbone network is a large-scale transport network, and it is used for connecting small-scale transport networks and transmitting data.

Fiber to The Building (FTTB) and Fiber To The Home (FTTH) have also become the best means for solving the bandwidth bottleneck problem of the access network, and the passive optical network technology is much popular for its advantages such as high bandwidth, long-distance transmission and point-to-multipoint topology and so on, and it has become a main application architecture for various countries deploying the FTTH and FTTB. A Passive Optical Network (PON) is a passive optical access technology using a point-to-multipoint topological structure. At present, an xPON system has been largely deployed to be commercial at home and abroad, and meanwhile, the operation maintenance technology of the PON network is also continuously developed and strengthened.

The Optical Time-Domain Reflectometer (OTDR) technology has a very important significance in the maintenance of optical network fault. Major indexes of the OTDR technology include a dynamic range, a spatial resolution and a dead zone and so on. Wherein, the dynamic range is related to a noise level of a practical circuit, an effective measuring range of an Analog-Digital Converter (ADC) and a resolution of the ADC. In a receiving circuit, reducing an offset voltage of the receiving circuit and a zero drift of the operational amplifier is conducive to improving the effective measuring range of the ADC and improving the detectability of the OTDR. In an OTDR receiving circuit, since the variation of amplitude of optical signals required to be detected is large, in order to ensure that small signals can be detected, a higher link gain is required to be designed, and the influence from the offset voltage of the pre-stage circuit including the dark current of optical devices will be amplified in the post-stage circuit, and the consequence is occupying a larger dynamic range of the ADC, thereby affecting the dynamic range which the system reaches. A manual zeroing method is used in the receiving circuit of the OTDR instrument, before performing measurement, zeroing is manually performed on an operational-amplifier zeroing terminal. A zeroing function can be completed well in this way, but it is not intelligent, which increases the manual complexity of the test. Another common zeroing method is an automatic zeroing method, and intervention by software is not required in such zeroing method, but the direct current component and low frequency component thereof will be affected, and the consequence is that a tested waveform is worse, which influences the identification of the OTDR event point.

SUMMARY OF THE INVENTION

The technical problem required to be solved by the present document is to provide a zeroing method and zeroing device for an OTDR, to overcome a disadvantage that a manual zeroing method is not intelligent and a measured waveform introduced in an automatic zeroing method is bad.

In order to solve the above technical problem, the present document provides a zeroing method for an optical time-domain reflectometer, which comprises:

before starting the optical time-domain reflectometer, when a laser device is in an off state, sending a zeroing signal; and performing zeroing processing according to the zeroing signal.

Preferably, the above method is further characterized in that: performing zeroing processing according to the zeroing signal comprises:

in a case that the zeroing signal is valid, receiving a voltage difference of output signals of a low noise amplifier, and performing zeroing on the low noise amplifier based on the voltage difference.

Preferably, the above method is further characterized in that:

in the process of performing zeroing, if the zeroing signal is removed, starting the optical time-domain reflectometer to perform testing.

Preferably, the above method is further characterized in that: in the process of the optical time-domain reflectometer performing testing, the method further comprises:

before the laser device sends a test pulse or a test sequence at any one time, sending a zeroing signal for performing zeroing processing.

Preferably, the above method is further characterized in that:

the zeroing signal is obtained through calculation according to a collected offset voltage, or it is obtained through lookup table, performing zeroing processing according to the zeroing signal comprises:

converting the zeroing signal into a zeroing voltage and then inputting the zeroing voltage to the low noise amplifier for performing zeroing.

In order to solve the above problem, the present document further provides a zeroing device, which is applied to an optical time-domain reflectometer, and comprises:

a first module, configured to: before starting the optical time-domain reflectometer, when a laser device is in an off state, send a zeroing signal;

a second module, configured to: perform zeroing processing according to the zeroing signal.

Preferably, the above device is further characterized in that: the second module comprises:

a first unit, configured to: in a case that the zeroing signal is valid, receive a voltage difference of output signals of a low noise amplifier, and perform zeroing on the low noise amplifier based on the voltage difference.

Preferably, the above device is further characterized in that:

the first module is further configured to: in the process of the first unit performing zeroing, if the zeroing signal is removed, start the optical time-domain reflectometer to perform testing.

Preferably, the above device is further characterized in that:

the first module is further configured to: in the process of the optical time-domain reflectometer performing testing, before the laser device sends a test pulse or a test sequence at any one time, send a zeroing signal, and trigger the second module to perform zeroing processing.

Preferably, the above device is further characterized in that:

the first module is configured to: obtain the zeroing signal through calculation according to a collected offset voltage, or obtain the zeroing signal through lookup table, the second module comprises:

a second unit, configured to: convert the zeroing signal into a zeroing voltage and then input the zeroing voltage to the low noise amplifier for performing zeroing.

In order to solve the above problem, the present document further provides an optical time-domain reflectometer, which comprises: a laser device, a low noise amplifier and the above zeroing device.

In conclusion, the embodiments of the present invention provide a zeroing method and zeroing device for an OTDR, and feedback zeroing is performed on the receiving circuit by utilizing the idle time prior to a test or the idle time during the test, thus the influence from the offset voltage is reduced, and a problem of the operational-amplifier zero drift also can be solved in the meantime, which improves a detectability of the OTDR, and overcomes a disadvantage that a manual zeroing method is not intelligent and a measured waveform introduced in an automatic zeroing method is bad.

PREFERRED EMBODIMENTS OF THE INVENTION

The embodiments of the present invention will be described in detail in combination with the accompanying drawings below. It should be noted that the embodiments in the present invention and the characteristics in the embodiments can be optionally combined with each other in the condition of no conflict.

Figure 1:
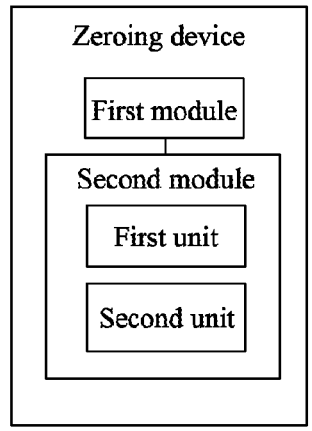
FIG. 1 is a schematic diagram of a zeroing device according to the embodiment of the present invention.

FIG. 1 is a schematic diagram of a zeroing device according to the embodiment of the present invention, and as shown in FIG. 1, the zeroing device of the embodiment includes:

a first module, used to: before starting the optical time-domain reflectometer, when a laser device is in an off state, send a zeroing signal;

a second module, used to: perform zeroing processing according to the zeroing signal.

Wherein, the second module can include:

a first unit, used to: in a case that the zeroing signal is valid, receive a voltage difference of output signals of a low noise amplifier, and perform zeroing on the low noise amplifier based on the voltage difference.

Wherein, the first module is also used to: in the process of the first unit performing zeroing, if the zeroing signal is removed, start the optical time-domain reflectometer to perform testing.

In one preferred embodiment, in the process of the optical time-domain reflectometer performing testing, the first module is also used to: before the laser device sends a test pulse or a test sequence at any one time, send a zeroing signal, and trigger the second module to perform zeroing processing.

In one preferred embodiment, the first module obtains the zeroing signal through calculation according to a collected offset voltage, or obtains the zeroing signal through lookup table, the second module includes:

a second unit, used to: convert the zeroing signal into a zeroing voltage and then input the zeroing voltage to the low noise amplifier for performing zeroing.

The disadvantage that a manual zeroing method is not intelligent and a measured waveform introduced in an automatic zeroing method is bad can be overcome with the zeroing device of the embodiment.

Figure 2:
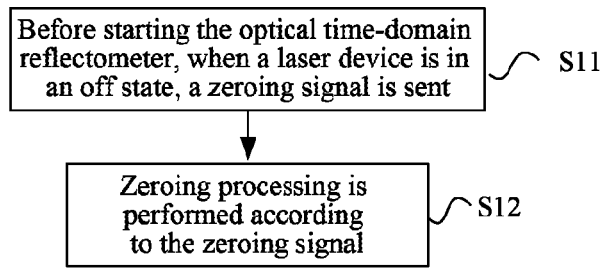
FIG. 2 is a flow chart of a zeroing method according to the embodiment of the present invention.

FIG. 2 is a flow chart of a zeroing method according to the embodiment of the present invention, and as shown in FIG. 2, the method of the embodiment includes the following steps.

In step S11, before starting the optical time-domain reflectometer, when a laser device is in an off state, a zeroing signal is sent.

In step S12, zeroing processing is performed according to the zeroing signal.

The zeroing method of the present document will be described in detail with two specific embodiments below.

Embodiment 1

Figure 3:
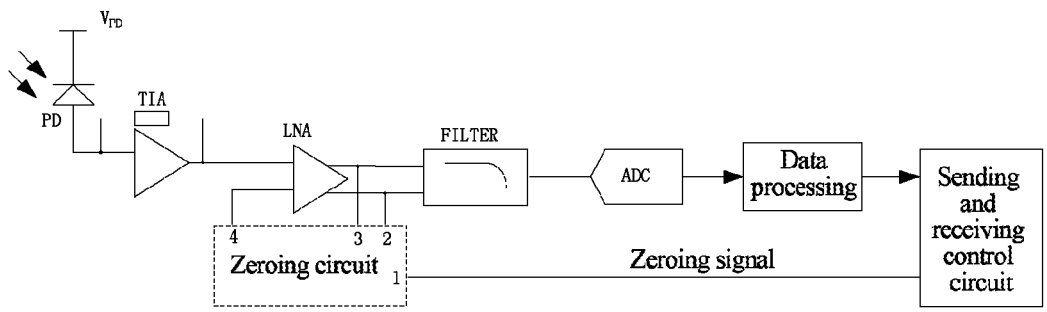
FIG. 3 is a schematic diagram of an optical time-domain reflectometer according to the embodiment 1 of the present invention.

As shown in FIG. 3, the optical time-domain reflectometer of the embodiment of the present invention includes the following constituent parts:

a photodiode (PD), a trans-impedance amplifier (TIA), a low noise amplifier (LNA), a low pass filter (FILTER), an analog-to-digital converter (ADC), data processing, a sending and receiving control circuit, a laser device (LD) driver, an LD and a zeroing circuit. Both the TIA and LNA at the receiving end will have the problem of offset voltage, in order to eliminate the influence from the offset voltage, the zeroing device of the embodiment is added in the circuit.

The zeroing device of the embodiment includes:

a sending and receiving control circuit (equivalent to a first module), used to: before starting the optical time-domain reflectometer, when a laser device is in an off state, send a zeroing signal;

a zeroing circuit (equivalent to a first unit of a second module), used to: in a case that the zeroing signal is valid, receive a voltage difference of output signals of a low noise amplifier, and perform zeroing on the low noise amplifier based on the voltage difference.

Wherein, the sending and receiving control circuit is also used to: in the process of the zeroing circuit performing zeroing, if the zeroing signal is removed, start the optical time-domain reflectometer to perform testing.

Wherein, the sending and receiving control circuit is also used to: before the laser device sends a test pulse or a test sequence at any one time, trigger the zeroing circuit to perform zeroing processing.

Figure 4:
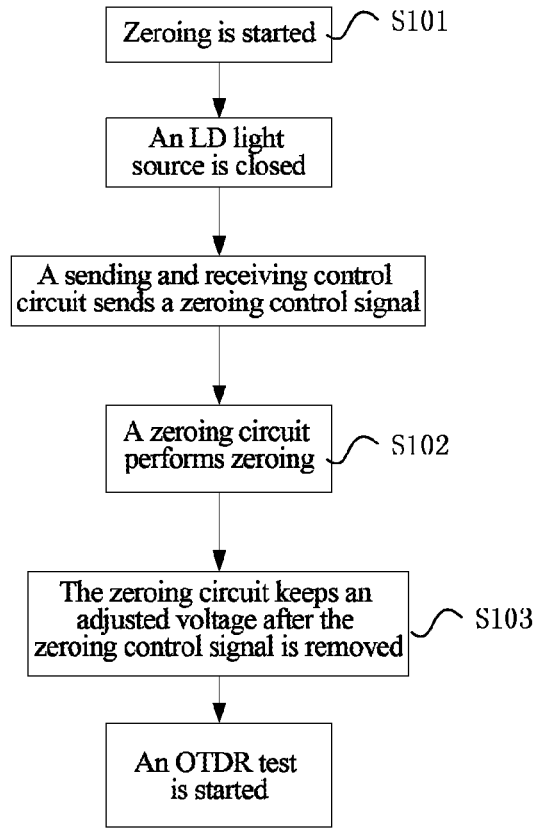
FIG. 4 is a flow chart of a zeroing method according to the embodiment 1 of the present invention.

As shown in FIG. 4, a zeroing method in the optical time-domain reflectometer of the embodiment includes the following steps.

In step S101, before starting an OTDR test, firstly an LD is closed, and a zeroing circuit is triggered to perform zeroing processing.

Specifically, a sending and receiving control circuit gives a zeroing signal pulse, and when a zeroing control signal is valid (it can be defined that high level is valid or low level is valid), the zeroing circuit is triggered to perform zeroing processing.

In step S102, the zeroing circuit performs zeroing processing.

Specifically, when the zeroing control signal is valid, an operational amplifier will give a voltage difference to the zeroing circuit according to a LNA differential output voltage difference, and a zeroing voltage is to provide a reference voltage for the input at one end of the LNA with the voltage difference as a basis for zeroing, and the output of the LNA can be adjusted by changing the reference voltage, so that an output voltage difference of the LNA is more approximated to 0, thereby achieving the goal of zeroing.

In step S103, in the process of the zeroing circuit performing zeroing, if the zeroing control signal is removed, the OTDR test is started.

After the zeroing control signal is removed, that is, the zeroing is completed, the zeroing circuit keeps the originally adjusted voltage, and then the OTDR test is started.

An offset voltage of the receiving circuit may be changed in the testing process, and adjustment also can be made in such case. According to the degree of change of the offset voltage, before the LD sends a test pulse or a test sequence at any one time, the sending and receiving control circuit can send a zeroing control signal for performing zeroing, and the test can be continued after the zeroing is completed.

In the embodiment, it is required to notice the following aspects during the zeroing: 1. It is to guarantee that the PD does not have any input light during the zeroing; 2. Zeroing is performed before each test or any tests, and zeroing time is generally dozens of uS; 3. The zeroing signal in the testing process must be kept in a removed state in order to avoid affecting a tested waveform.

In the method of the embodiment, zeroing is performed on the circuit prior to a complete OTDR test, or zeroing is performed by utilizing the idle time in the testing process, which ensures a minimum offset voltage of the system, increases an effective dynamic range of the system, and also guarantees a consistency of the test in the meantime.

Embodiment 2

Figure 5:
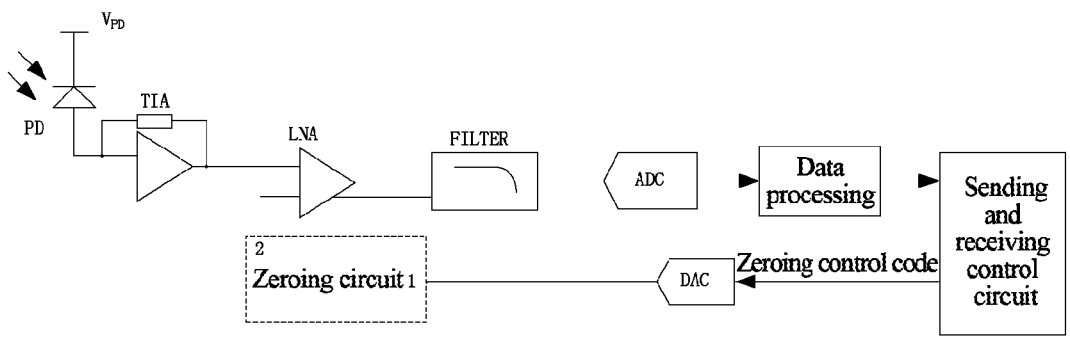
FIG. 5 is a schematic diagram of an optical time-domain reflectometer according to the embodiment 2 of the present invention.

The difference between the embodiment 2 and the embodiment 1 is that, an ADC collects the amplitude of offset voltage, then a sending and receiving control circuit gives a zeroing control code, and a DAC converts the zeroing control code into an analog zeroing voltage, and gives the analog zeroing voltage to the zeroing circuit for performing zeroing, and the OTDR of the embodiment is as shown in FIG. 5, in the zeroing device of the embodiment, the zeroing signal is a zeroing control code obtained by the sending and receiving control circuit through calculation according to the collected offset voltage, or it is a zeroing control code obtained through lookup table.

The zeroing circuit of the embodiment (equivalent to a second unit of the second module) is used to convert the zeroing control code into a zeroing voltage and then input the zeroing voltage to a low noise amplifier for performing zeroing.

The zeroing control code can be sent to the DAC and converted into the analog zeroing voltage, then it goes through the zeroing circuit, and it is finally output to an input end of the LNA and serves as a reference level of the LNA, by changing the reference level, a zeroing function can be implemented.

Wherein, the zeroing control code can be acquired by using the method of repeated measurements through the ADC, that is, firstly a value is given, after the adjustment, it is to observe what the offset voltage collected by the ADC is, and then another value is given, the offset voltage is reduced, a small amplitude of adjustment is made each time, and finally the offset voltage reaches a permissible range. In such method, the adjustment time is long, and efficiency is low, but the accuracy of the adjusted value is high, which is not affected by the temperature drift.

A lookup table of relationship between the offset voltage and the zeroing control code also can be established in advance, and the ADC collects and acquires a value of the offset voltage, and by means of lookup table, the zeroing control code is obtained, thus the complete zeroing can be performed at one time, and the adjustment time is short, and the efficiency is high, but the accuracy is not high, which is easily affected by the temperature drift.

Figure 6:
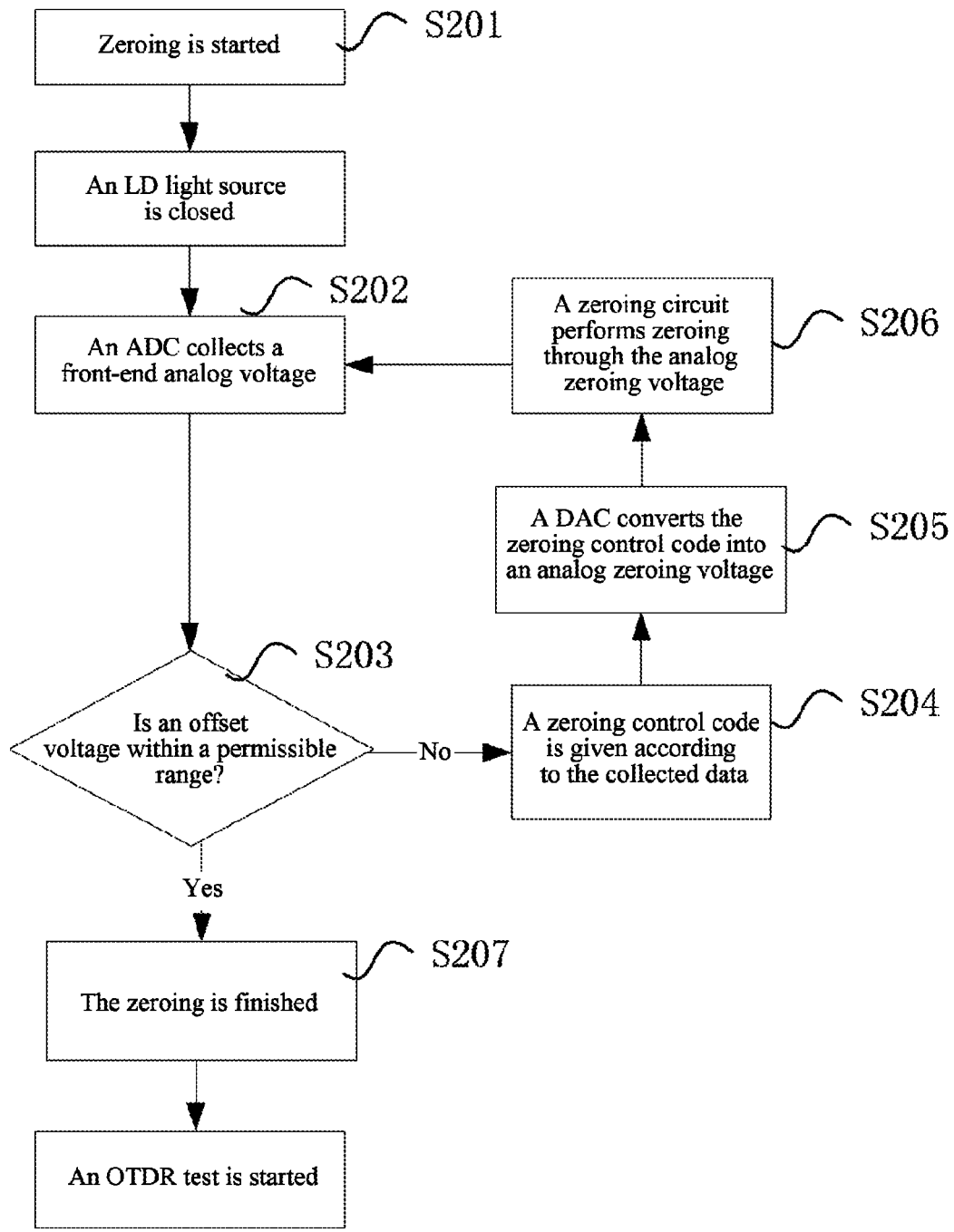
FIG. 6 is a flow chart of a zeroing method according to the embodiment 2 of the present invention.

FIG. 6 is a flow chart of a zeroing method according to the embodiment, and as shown in FIG. 6, the following steps are included.

In step S201, before starting an OTDR test, firstly an LD is closed.

In step S202, an ADC collects a front-end analog voltage (i.e. an offset voltage), and outputs the offset voltage to a sending and receiving control circuit.

In step S203, the sending and receiving control circuit judges whether the offset voltage is within a permissible range, if the offset voltage is not within the permissible range, it proceeds to step S204, and if the offset voltage is within the permissible range, it proceeds to step S207.

In step S204, the sending and receiving control circuit gives a zeroing control code.

In step S205, a DAC converts the zeroing control code into an analog zeroing voltage.

In step S206, a zeroing circuit performs zeroing through the analog zeroing voltage, and then it returns to the step S202.

In step S207, the zeroing is finished, the zeroing code is kept unchanged, and the OTDR test is started.

In the OTDR testing process, before the LD sends a test pulse or a test sequence at any one time, the sending and receiving control circuit can send a zeroing control code for performing zeroing, and the test can be continued after the zeroing is completed.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or multiple integrated circuits. Correspondingly, each module/unit in the above embodiments can be implemented in a form of hardware, and also can be implemented in a form of software function module. The present document is not limited to any combination of hardware and software in a specific form.

The above description is only the preferred embodiments of the present invention. Certainly, the present document can still have other various embodiments, and the skilled familiar to the art can make various corresponding changes and transformations according to the present document without departing from the spirit and essence of the present document, and these corresponding changes and transformations shall all fall into the protection scope of the appended claims of the present document.

INDUSTRIAL APPLICABILITY

With the OTDR and zeroing method of the embodiments of the present invention, compared to the related art, a flexibility of the zeroing method is strengthened, and a quality of the tested waveform is guaranteed in the meantime, which increases an effect of the effective dynamic range, reduces the influence from the temperature drift and instrument offset voltage, and enhances the overall detection performance.

What is claimed is:

1. A zeroing method for an optical time-domain reflectometer, comprising:
   before starting the optical time-domain reflectometer, when a laser device is in an off state, sending a zeroing signal;
   performing zeroing processing according to the zeroing signal; wherein performing zeroing processing according to the zeroing signal comprises:
   in a case that the zeroing signal is valid, receiving a voltage difference of output signals of a low noise amplifier, and performing zeroing on the low noise amplifier based on the voltage difference.

2. The method according to claim 1, wherein,
   in the process of performing zeroing, if the zeroing signal is removed, starting the optical time-domain reflectometer to perform testing.

3. The method according to claim 2, in a process of the optical time-domain reflectometer performing testing, further comprising:
   before the laser device sends a test pulse or a test sequence at any one time, sending a zeroing signal for performing zeroing processing.

4. The method according to claim 1, wherein,
   the zeroing signal is obtained through calculation according to a collected offset voltage, or obtained through lookup table,
   performing zeroing processing according to the zeroing signal comprises:
   converting the zeroing signal into a zeroing voltage and then inputting the zeroing voltage to a low noise amplifier for performing zeroing.

5. A zeroing device, applied to an optical time-domain reflectometer, comprising:
   a first module including a sending and receiving control circuit, configured to: before starting the optical time-domain reflectometer, when a laser device is in an off state, send a zeroing signal;
   a second module comprising a zeroing circuit, including a first unit configured to: perform zeroing processing according to the zeroing signal;
   wherein performing zeroing processing includes, in a case that the zeroing signal is valid, receiving a voltage difference of output signals of a low noise amplifier, and performing zeroing on the low noise amplifier based on the voltage difference.

6. The zeroing device according to claim 5, wherein,
   the first module is further configured to: in a process of the first unit performing zeroing, if the zeroing signal is removed, start the optical time-domain reflectometer to perform testing.

7. The zeroing device according to claim 6, wherein,
   the first module is further configured to: in a process of the optical time-domain reflectometer performing testing, before the laser device sends a test pulse or a test sequence at any one time, send a zeroing signal, and trigger the second module to perform zeroing processing.

8. The zeroing device according to claim 7, wherein,
   the first module is configured to: obtain the zeroing signal through calculation according to a collected offset voltage, or obtain the zeroing signal through lookup table,
   the zeroing circuit of the second module comprises:
   a second unit, configured to: convert the zeroing signal into a zeroing voltage and then input the zeroing voltage to a low noise amplifier for performing zeroing.

9. An optical time-domain reflectometer, comprising: a laser device, a low noise amplifier and the zeroing device according to claim 7.

10. The zeroing device according to claim 6, wherein,
    the first module is configured to: obtain the zeroing signal through calculation according to a collected offset voltage, or obtain the zeroing signal through lookup table,
    the zeroing circuit of the second module comprises:
    a second unit, configured to: convert the zeroing signal into a zeroing voltage and then input the zeroing voltage to a low noise amplifier for performing zeroing.

11. An optical time-domain reflectometer, comprising: a laser device, a low noise amplifier and the zeroing device according to claim 10.

12. An optical time-domain reflectometer, comprising: a laser device, a low noise amplifier and the zeroing device according to claim 6.

13. The zeroing device according to claim 5, wherein,
the first module is configured to: obtain the zeroing signal through calculation according to a collected offset voltage, or obtain the zeroing signal through lookup table,
the zeroing circuit of the second module further comprises:
a second unit, configured to: convert the zeroing signal into a zeroing voltage and then input the zeroing voltage to a low noise amplifier for performing zeroing.

14. An optical time-domain reflectometer, comprising: a laser device, a low noise amplifier and the zeroing device according to claim 13.

15. An optical time-domain reflectometer, comprising: a laser device, a low noise amplifier and the zeroing device according to claim 5.

* * * * *